US009883241B2

(12) United States Patent
Khare et al.

(10) Patent No.: US 9,883,241 B2
(45) Date of Patent: Jan. 30, 2018

(54) SYSTEM AND METHOD FOR AUTOMATIC CONTENT RECOGNITION AND AUDIENCE MEASUREMENT FOR TELEVISION CHANNELS AND ADVERTISEMENTS

(71) Applicant: SUREWAVES MEDIATECH PRIVATE LIMITED, Bangalore (IN)

(72) Inventors: Rajendra Kumar Khare, Bangalore (IN); Manajit Rath, Bangalore (IN); Kishore Adekhandi Krishnamurthy, Bangalore (IN)

(73) Assignee: SUREWAVES MEDIATECH PRIVATE LIMITED, Karnataka (IN)

( * ) Notice: Subject to any disclaimer, the term of this patent is extended or adjusted under 35 U.S.C. 154(b) by 0 days.

(21) Appl. No.: 15/155,065

(22) Filed: May 15, 2016

(65) Prior Publication Data

US 2016/0337701 A1    Nov. 17, 2016

(51) Int. Cl.
| H04H 60/56 | (2008.01) |
| H04N 21/466 | (2011.01) |
| H04N 21/25 | (2011.01) |
| H04N 21/81 | (2011.01) |
| H04N 21/439 | (2011.01) |

(Continued)

(52) U.S. Cl.
CPC ....... *H04N 21/4667* (2013.01); *H04N 21/252* (2013.01); *H04N 21/25883* (2013.01); *H04N 21/42203* (2013.01); *H04N 21/4394* (2013.01); *H04N 21/44008* (2013.01); *H04N 21/44204* (2013.01); *H04N 21/44218* (2013.01); *H04N 21/44222* (2013.01); *H04N 21/4532* (2013.01); *H04N 21/812* (2013.01)

(58) Field of Classification Search
CPC ............. H04N 21/2668; H04N 21/251; H04N 21/25883; H04N 21/25891; H04N 21/44008; H04N 21/44222; H04N 21/4828; H04N 21/858; H04N 21/4667; H04N 21/252; H04N 21/42203; H04N 21/4394; H04N 21/44204
USPC ......................................................... 725/18
See application file for complete search history.

(56) References Cited

U.S. PATENT DOCUMENTS

| 8,769,558 | B2 * | 7/2014 | Navar | G06Q 30/02 725/14 |
| 2012/0017231 | A1 * | 1/2012 | Chao | G06Q 30/02 725/12 |

(Continued)

*Primary Examiner* — Nathan Flynn
*Assistant Examiner* — Alfonso Castro
(74) *Attorney, Agent, or Firm* — Barry Choobin; Patent 360 LLC (57) ABSTRACT

The embodiments herein provide a system and method for measuring active participation of audience watching a TV programs and advertisements, in terms of age and gender. The system comprises a monitoring device which is configured to record TV audio, room audio and TV visual outputs, using an image sensor. The monitoring device is further configured to detect the audience engagement level, in watching the TV show, by monitoring the audience expressions and behavior. The audience engagement level is also detected by tracking the eye ball movement of the audience. The monitoring device is configured to continuously check and detect visitors who have joined along with already registered viewers to watch the TV programs. The monitored information is analyzed and visitor/viewer profile is created accordingly.

10 Claims, 7 Drawing Sheets

(51) Int. Cl.
*H04N 21/44* (2011.01)
*H04N 21/442* (2011.01)
*H04N 21/258* (2011.01)
*H04N 21/45* (2011.01)
*H04N 21/422* (2011.01)

(56) References Cited

U.S. PATENT DOCUMENTS

2013/0014138 A1* 1/2013 Bhatia .................. H04N 21/252
                                                              725/9
2013/0298146 A1* 11/2013 Conrad ................ H04N 21/252
                                                              725/12
2014/0359647 A1* 12/2014 Shoemake ......... H04N 5/23206
                                                              725/10
2015/0150031 A1* 5/2015 Gibbon .................. H04H 60/45
                                                              725/12

* cited by examiner

SYSTEM AND METHOD FOR AUTOMATIC CONTENT RECOGNITION AND AUDIENCE MEASUREMENT FOR TELEVISION CHANNELS AND ADVERTISEMENTS

CROSS-REFERENCE TO RELATED APPLICATION

This application claims the priority of the Indian Provisional Patent Application with serial number 1955/CHE/2015 filed on Apr. 17, 2015 and subsequently post-dated to May 17, 2015 with the title "A SYSTEM AND METHOD FOR AUTOMATIC CONTENT RECOGNITION AND AUDIENCE MEASUREMENT FOR TELEVISION CHANNELS AND ADVERTISEMENTS", and the contents of which is incorporated in entirety.

BACKGROUND

Technical Field

The embodiments herein is generally related to an audience measurement system and method. The embodiments herein is particularly related to a system and method for audience measurement for TV channels, programs and advertisements. The embodiments herein is more particularly related to a monitoring device and a system for measuring active participation of audience watching TV channels, programs and advertisements.

Description of the Related Art

The electronic media such as Television (TV), and radio broadcast has become the dominant medium for information dissemination, commercial communication and entertainment. With billions of dollars spent annually on the TV programs and commercials, a reliable audience information or metrics is required to evaluate and maximize the effectiveness of the investment. Also, a knowledge or a measurement of size and composition of an audience to televisions or radio broadcast is important to rate the advertisings. This has led to an increasing desire in broadcasters, advertisers and advertising agencies to have accurate, consistent and detailed information about TV and other electronic media audiences.

Several approaches have been proposed for measuring the audience data and profiling them. Some of the existing systems use a dedicated remote control to allow an interaction with the users (audiences) and collects the audience data. In such systems, audience has to manually enter the inputs through the remote and this method is not reliable all the times. For example, the audience is not engaged in watching the show even though the TV is switched on. Further, such remote based systems do not provide provision for the audiences to enter visitor information/data. Some other systems use sensor in the device(s) connecting the audio/video appliances with the network. The sensor allows a tracking of the data packet traffic and the origin of the data. In some other systems, the users enter the data regarding demographic of age and gender through a remote device.

In some other systems, an acoustic output of a household audio/video appliance is picked up by a microphone of the monitor. The monitor has a reference receiver and matches the microphone signal with the audio output of the reference amplifier which scans the available broadcast channels. A new development in the media consumption is the use of a personal computer such as laptops to view the TV programs. Since the known monitoring devices are permanently coupled to audio/video appliances, these devices are well suited for accurately profiling the audience while watching TV shows/programs and advertisements in the personal computers. But none of the devices provide an accurate audience measurement for the television programs and advertisements. Further, none of the presently available systems provide an accurate audience measurement for the television programs and advertisements based on adults, gender, and age.

Hence there is a need for a monitoring device and a system that measures the active participation of the audience watching the TV shows/programs and advertisements. Further, there is a need for a system and method for a monitoring device that detects the visitors and profiles the audiences based on age, gender, time for the TV programs and commercial advertisements. Still further, there is a need for a system and method to provide an audience measurement for a real time viewing, staggered viewing and recorded viewing of the programs and advertisements. Yet there is a need for a system and method to detect an advertisement duration and time in a television channel accurately. Yet there is a need for a system and method to detect an expression and emotion of advertisement and program telecast in a television channel accurately.

The above mentioned shortcomings, disadvantages and problems are addressed herein and which will be understood by reading and studying the following specification.

OBJECTS OF THE EMBODIMENTS HEREIN

The primary object of the embodiments herein is to measure an active viewership of an audience watching the TV shows/programs and advertisements in terms of age and gender.

Yet another object of the embodiments herein is to detect an audience engagement level while watching the TV shows/programs and advertisements using a combination of an audio output or audio fingerprint of a TV receiver and programs, an audio output or audio fingerprint at a room and a visual output or video fingerprint of the TV receiver/program.

Yet another object of the embodiments herein is to create an audience profile without using a dedicated remote system.

Yet another object of the embodiments herein is to detect whether the audience is engaged (actively) in looking/viewing at the TV screen while watching the TV shows and advertisements.

Yet another object of the embodiments herein is to detect a mood/emotion or expression of the audience while watching the TV shows or the advertisements.

Yet another object of the embodiments herein is to detect and profile a visitor/viewer/audience watching the TV shows and advertisements.

Yet another object of the embodiments herein is to detect a TV channel in time shifted mode.

Yet another object of the embodiments herein is to detect a media content or a channel information without using a Logo or an Image or an audio watermark or finger print.

Yet another object of the embodiments herein is to detect the time shifted advertisements and audience engagement in watching the advertisements.

These and other objects and advantages of the embodiments herein will become readily apparent from the following detailed description taken in conjunction with the accompanying drawings.

SUMMARY

The various embodiments herein provide a system and method for measuring an active viewing of an audience watching a TV show and advertisements.

According to an embodiment herein, an audience measurement and profiling system is provided for measuring active viewing of audience watching a television (TV) show and advertisements. The audience measurement and profiling system comprises a database configured for storing information, and wherein the information includes a demographic data of members in a home, a date and time stamp of telecasted data for a preset time period. A monitoring device is installed in the home and configured for detecting an audience engagement level using a data collected from a room where a television is placed. The data includes audio output and/or audio finger print of TV, audio output and/or audio finger print at the room, and visual outputs and/or video finger print of the TV, information regarding a visitor. A network is configured to act as a dedicated pathway for transfer of data between the monitoring module and a central server. A central server is configured to compare the data received from the monitoring device with the information stored in the database to detect and record TV channel information in time shifted mode and to analyze the monitored audience engagement and profile.

According to an embodiment herein, the monitoring device comprises an image sensor configured to capture the audio outputs and the video outputs of the TV that is currently viewed by the audience and an image of the room environment. The audio output is captured with a microphone and recorded with an audio recording device. A recording module is configured and run by a hardware processor to record audio of TV, room audio, and the visual outputs TV through the image sensor. A visitor detection module is run by the hardware processor and configured to continuously monitor the room for detecting whether a visitor is joined to the room to watch the TV show. An eyeball tracking module is run by the hardware processor and configured to detect the audience engagement level by checking whether the audience looks at the TV screen while watching the TV show. A data collection module is run by the hardware processor and configured to capture the demographic data including age, gender, and emotion/expression of the audience from the data captured by the image sensor. A communication module is configured to transmit the recorded TV audio, room audio, TV visual outputs, information regarding the visitor, and audience engagement level to the central server.

According to an embodiment herein, the central server comprises a comparison module run on the hardware processor and configured to compare the data received from the monitoring device with the information stored in the database. An image recognition module is run on the hardware processor and configured to analyze data monitored regarding the audience to determine a profile information. The profile information includes gender, age, and trend. An analytics module is run on the hardware processor and configured to determine the audience engagement level by analyzing the captured mood or expression of the audience with the eyeball tracking module in the monitoring device. An audience profiling module is run on the hardware processor and configured to create a profile of the audience including visitor using the information analyzed by the analytics module and the image recognition module.

According to an embodiment herein, the network is a wireless network or wired network or public network. The network is selected from a group consisting of an Internet, private network, General Packet Radio Network (GPRS), Local Area Network (LAN), Wide Area Network (WAN), Metropolitan Area Network (MAN), cellular network, Public Switched Telephone Network (PSTN), personal area network.

According to an embodiment herein, the audience measurement and profiling system is configured to detect whether the audience skips the advertisements or watches the advertisements even during the watching of TV show in time shifted or recorded mode.

According to an embodiment herein, the demographic data of the members is initially stored in the database during an empanelment of the monitoring device. The demographic data comprises name, age, gender, education details.

According to an embodiment herein, the database stores the date and time stamp of telecasted data for a preset time period from a local server. The telecasted data comprises data telecasted on all TV channels in real time According to an embodiment herein, the central server is configured to identify the visitor by comparing the data from the room with the demographic data of the members stored in the database.

According to an embodiment herein, the monitoring device is further configured to locally store the captured data when internet connectivity is not available. The monitoring device buffers and transmits the captured data to the central server when the internet connectivity is available.

According to an embodiment herein, the monitoring device is further configured to measure an active participation of an audience while watching the TV shows and advertisements on a portable computing device.

According to an embodiment herein, the system is configured to detect an advertisement, an advertisement telecast time and duration of telecast of an advertisement in a television channel accurately. The system comprises an advertisement capture module and an advertisement detection module provided in the monitoring device. The advertisement capture module is run on a hardware processor and configured to capture an advertisement telecast on a television channel watched by the audience. The original advertisement telecast on a plurality of channels are downloaded and saved on a database. Then audio finger prints of the advertisement are extracted and saved along with the original video outputs of the advertisement, the advertisement detection module is run of the hardware processor and configured to compute the audio fingerprints of the incoming TV channel. The computed audio fingerprints are compared with the stored audio finger prints of the advertisements, the strength of match of the audio finger prints of the advertisement is computed. The computed strength of match of the audio finger prints is compared with a preset threshold strength value. When the computed strength of match of the audio finger prints is more than the preset threshold strength value, the captured audio finger prints is judged or detected to be the audio finger print of an advertisement. When the computed strength of match of the audio finger prints is equal to the preset threshold strength value, the captured audio finger prints is judged or detected to be the audio finger print of an advertisement.

When the computed strength of match of the audio finger prints is far less the preset threshold strength value, the captured audio finger prints is judged or detected not to be the audio finger print of an advertisement, and the captured audio fingerprint is deleted or omitted.

When the computed strength of match of the audio finger prints is less the preset threshold strength value, a video comparison of the advertisement is carried out to confirm the advertisement start and completion time to compute the advertisement telecast time and the duration of the advertisement telecasted.

The video output and the video fingerprint of the captured advertisement is compared with the stored video output and the video fingerprint of the advertisement telecasted in frame by frame manner to detect the advertisement start frame, intermediate frames and the advertisement completion frame to calculate the advertisement start time and advertisement completion time accurately. Based on the first frame and the last frame, the advertisement telecast time and the advertisement telecast duration are also computed and provided to the advertisement sponsor with a proof of video. The duration and the telecast time of the advertisement are computed with an accuracy of 40 milliseconds.

According to an embodiment herein, the video detection algorithm is provided to accurately measure the advertisement start time, advertisement end time, and advertisement telecast duration in a television channel with a time and date stamp.

According to an embodiment herein, the eyeball detection algorithm is used to detect the actual viewing of the advertisement by an audience accurately by capturing and analyzing the eye ball movement of the audience from the images captured with the image sensor. The analysis of the eyeball movement is done with the data derivation module and analytics module.

According to an embodiment herein, the data derivation module detects and identifies the expression of the audience during a viewing of an advertisement and a television channel by analyzing images of the captured image of the audiences and the captured audio of the audience.

The various embodiments herein provide a system and method for measuring an active viewing of an audience watching a TV show and advertisements.

The system comprises a monitoring device and a central server which are connected through a network. The monitoring device is configured to record TV audio output or audio finger print, room audio output or audio finger print and TV visual outputs or video finger prints, using an image sensor, while the audience watches the TV shows/programs and advertisements. The monitoring device is further configured to detect an audience engagement level by monitoring an audience expressions and behavior. The audience engagement level is also detected by checking an eye ball movement of an audience viewing the TV screen using an eyeball tracking technique. Furthermore, the monitoring device is configured to continuously check and detect the visitors (new viewers) who have joined to watch the TV shows along with the regular or already registered viewers.

According to an embodiment herein, an audience measurement and profiling system for measuring an active viewing of the audience watching a TV show and advertisements is disclosed. The audience measurement and profiling system comprises a database, a monitoring device, a network, and a central server.

According to an embodiment herein, the database is configured for storing an information including demographic data of members in a home, and a date and time stamp of the telecasted data for a preset time period. The monitoring device is installed in the home and is configured for detecting the audience engagement level using the data collected from a room environment where the television is placed. The data includes TV audio output or audio finger print, room audio output or audio finger print, TV visual outputs output or video finger print, an information regarding the visitor, and the audience engagement level. The network is configured to act as a dedicated pathway for the transfer of data between the monitoring device and the central server. The central server is configured to compare the data received from the monitoring device with the information stored in the database to detect and record a TV channel information in a time shifted mode and to analyze the monitored audience engagement and profile.

According to an embodiment herein, the monitoring device in the audience measurement and profiling system comprises an image sensor, a recording module/device, a visitor detection module, an eyeball tracking module, a data derivation module and a communication module. The image sensor is configured to capture the TV audio/visual outputs or finger prints that are currently viewed by the audience and the images of the room environment. The recording module/device is configured to record TV audio output or audio finger print, room audio output or audio finger print, and TV visual outputs or video fingerprints through the image sensor. The visitor detection module is configured to continuously monitor the room environment for detecting whether a visitor joined the audience to watch the TV show. The eyeball tracking module is configured to detect the audience engagement level by checking whether the audience is actively engaged in looking/viewing at the TV screen while watching the TV show. The data derivation module is configured to capture the demographic data including age, gender, and emotion/expression of the audience from the data captured by the image sensor. The communication module is configured to transmit the recorded TV audio output or audio finger print, room audio output or audio finger print, TV visual outputs or video fingerprints, the information regarding visitor, and audience engagement level to the central server.

According to an embodiment herein, the central server in the audience measurement and profiling system comprises a comparison module, an image recognition module, an analytics module, and an audience profiling module. The comparison module is configured to compare the data received from the monitoring device with the information stored in the database. The image recognition module is configured to analyze the data monitored regarding/with respect to the audience to determine the profile information such as, gender, age, and trend, etc. The analytics module is configured to determine the audience engagement level by analyzing the captured mood or expression of the audience by an eyeball tracking module in the monitoring device. The audience profiling module is configured to create a profile of the audience including the visitor using the information analyzed by the analytics module and the image recognition module.

According to an embodiment herein, the network is selected from a group consisting of a wireless network, wired network and public network.

According to an embodiment herein, the network is selected from a group consisting of an Internet, private network, General Packet Radio Network (GPRS), Local Area Network (LAN), Wide Area Network (WAN), Metropolitan Area Network (MAN), cellular network, Public Switched Telephone Network (PSTN), personal area network, and the like.

According to an embodiment herein, the audience measurement and profiling system is capable of detecting whether the audience skips the advertisements or watches the advertisements even during the watching of TV show in time shifted or recorded mode.

According to an embodiment herein, the demographic data of the members is initially stored in the database during an empanelment of the monitoring device.

According to an embodiment herein, the demographic data comprises name, age, gender, education details, etc., of the audience and the visitor.

According to an embodiment herein, the database stores the date and time stamp of telecasted data for a preset time period from a local server. The stored data comprises the data telecasted on all TV channels in real time.

According to an embodiment herein, the central server identifies a visitor by comparing the data from the room environment with the demographic data of the members stored in the database.

According to an embodiment herein, the monitoring device is further configured to locally store the captured data in the absence of internet connectivity, and further buffer and transmit the data to the central server automatically when the internet connectivity is available.

According to an embodiment herein, the monitoring device is further configured to measure an active participation of an audience while watching the TV shows/programs and advertisements on a portable computing device.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Throughout the specification the terms 'audience' and 'viewer' are used interchangeably.

The various embodiments herein provide a system and method for measuring an active viewing of an audience watching a TV show and advertisements.

According to an embodiment herein, an audience measurement and profiling system is provided for measuring active viewing of audience watching a television (TV) show and advertisements. The audience measurement and profiling system comprises a database configured for storing information, and wherein the information includes a demographic data of members in a home, a date and time stamp of telecasted data for a preset time period. A monitoring device is installed in the home and configured for detecting an audience engagement level using a data collected from a room where a television is placed. The data includes audio output and/or audio finger print of TV, audio output and/or audio finger print at the room, and visual outputs and/or video finger print of the TV, information regarding a visitor. A network is configured to act as a dedicated pathway for transfer of data between the monitoring module and a central server. A central server is configured to compare the data received from the monitoring device with the information stored in the database to detect and record TV channel information in time shifted mode and to analyze the monitored audience engagement and profile.

According to an embodiment herein, the monitoring device comprises an image sensor configured to capture the audio outputs and the video outputs of the TV that is currently viewed by the audience and an image of the room environment. The audio output is captured with a microphone and recorded with an audio recording device. A recording module is configured and run by a hardware processor to record audio of TV, room audio, and the visual outputs TV through the image sensor. A visitor detection module is run by the hardware processor and configured to continuously monitor the room for detecting whether a visitor is joined to the room to watch the TV show. An eyeball tracking module is run by the hardware processor and configured to detect the audience engagement level by checking whether the audience looks at the TV screen while watching the TV show. A data collection module is run by the hardware processor and configured to capture the demographic data including age, gender, and emotion/expression of the audience from the data captured by the image sensor. A communication module is configured to transmit the recorded TV audio, room audio, TV visual outputs, information regarding the visitor, and audience engagement level to the central server.

According to an embodiment herein, the central server comprises a comparison module run on the hardware processor and configured to compare the data received from the monitoring device with the information stored in the database. An image recognition module is run on the hardware processor and configured to analyze data monitored regarding the audience to determine a profile information. The profile information includes gender, age, and trend. An analytics module is run on the hardware processor and configured to determine the audience engagement level by analyzing the captured mood or expression of the audience with the eyeball tracking module in the monitoring device. An audience profiling module is run on the hardware processor and configured to create a profile of the audience including visitor using the information analyzed by the analytics module and the image recognition module.

According to an embodiment herein, the network is a wireless network or wired network or public network. The network is selected from a group consisting of an internet, private network, General Packet Radio Network (GPRS), Local Area Network (LAN), Wide Area Network (WAN), Metropolitan Area Network (MAN), cellular network, Public Switched Telephone Network (PSTN), personal area network.

According to an embodiment herein, the audience measurement and profiling system is configured to detect whether the audience skips the advertisements or watches the advertisements even during the watching of TV show in time shifted or recorded mode.

According to an embodiment herein, the demographic data of the members is initially stored in the database during an empanelment of the monitoring device. The demographic data comprises name, age, gender, education details.

According to an embodiment herein, the database stores the date and time stamp of telecasted data for a preset time period from a local server. The telecasted data comprises data telecasted on all TV channels in real time According to an embodiment herein, the central server is configured to identify the visitor by comparing the data from the room with the demographic data of the members stored in the database.

According to an embodiment herein, the monitoring device is further configured to locally store the captured data when internet connectivity is not available. The monitoring device buffers and transmits the captured data to the central server when the internet connectivity is available.

According to an embodiment herein, the monitoring device is further configured to measure an active participation of an audience while watching the TV shows and advertisements on a portable computing device.

According to an embodiment herein, the system is configured to detect an advertisement, an advertisement telecast time and duration of telecast of an advertisement in a television channel accurately. The system comprises an advertisement capture module and an advertisement detection module provided in the monitoring device. The advertisement capture module is run on a hardware processor and configured to capture an advertisement telecast on a television channel watched by the audience. The original advertisement telecast on a plurality of channels are downloaded and saved on a database. Then audio finger prints of the advertisement are extracted and saved along with the original video outputs of the advertisement, the advertisement detection module is run of the hardware processor and configured to compute the audio fingerprints of the incoming TV channel. The computed audio fingerprints are compared with the stored audio finger prints of the advertisements, the strength of match of the audio finger prints of the advertisement is computed. The computed strength of match of the audio finger prints is compared with a preset threshold strength value. When the computed strength of match of the audio finger prints is more than the preset threshold strength value, the captured audio finger prints is judged or detected to be the audio finger print of an advertisement. When the computed strength of match of the audio finger prints is equal to the preset threshold strength value, the captured audio finger prints is judged or detected to be the audio finger print of an advertisement.

When the computed strength of match of the audio finger prints is far less the preset threshold strength value, the captured audio finger prints is judged or detected not to be the audio finger print of an advertisement, and the captured audio fingerprint is deleted or omitted.

When the computed strength of match of the audio finger prints is less the preset threshold strength value, a video comparison of the advertisement is carried out to confirm the advertisement start and completion time to compute the advertisement telecast time and the duration of the advertisement telecasted.

The video output and the video fingerprint of the captured advertisement is compared with the stored video output and the video fingerprint of the advertisement telecasted in frame by frame manner to detect the advertisement start frame, intermediate frames and the advertisement completion frame to calculate the advertisement start time and advertisement completion time accurately. Based on the first frame and the last frame, the advertisement telecast time and the advertisement telecast duration are also computed and provided to the advertisement sponsor with a proof of video. The duration and the telecast time of the advertisement are computed with an accuracy of 40 milliseconds.

According to an embodiment herein, the video detection algorithm is provided to accurately measure the advertisement start time, advertisement end time, and advertisement telecast duration in a television channel with a time and date stamp.

According to an embodiment herein, the eyeball detection algorithm is used to detect the actual viewing of the advertisement by an audience accurately by capturing and analyzing the eye ball movement of the audience from the images captured with the image sensor. The analysis of the eyeball movement is done with the data derivation module and analytics module.

According to an embodiment herein, the data derivation module detects and identifies the expression of the audience during a viewing of an advertisement and a television channel by analyzing images of the captured image of the audiences and the captured audio of the audience.

The various embodiments herein provide a system and method for measuring an active viewing of audience watching a TV show and advertisements. The system comprises a monitoring device and a central server which are connected through a network. The monitoring device is configured to record TV audio output and/or audio finger print, room audio output and/or audio finger print and TV visual outputs and/or video finger prints, using an image sensor, while the audience watches the TV show/program and advertisements. The monitoring device is further configured to detect the audience engagement level by monitoring the audience expressions and behavior. The audience engagement level is also detected by checking the eye ball movement of audience viewing the TV screen using eyeball tracking technique. Furthermore, the monitoring device is configured to continuously check and detect the visitors (new viewers)

who have joined to watch the TV shows along with the regular or already registered viewers.

According to an embodiment herein, an audience measurement and profiling system for measuring an active viewing of an audience watching a TV show and advertisements is disclosed. The audience measurement and profiling system comprises a database, a monitoring device, a network, and a central server.

According to an embodiment herein, the database is configured for storing an information including a demographic data of the members in a home, and a date and time stamp of the telecasted data for a preset time period. The monitoring device is installed in the home and is configured for detecting the audience engagement level using the data collected from a room environment where television is placed. The data includes TV audio output and/or audio finger print, room audio output and/or audio finger print output, TV visual outputs or video finger print, an information regarding a visitor, and an audience engagement level. The network is configured to act as a dedicated pathway for the transfer of data between the monitoring module and the central server. The central server is configured to compare the data received from the monitoring device with the information stored in the database to detect and record TV channel information in time shifted mode and to analyze the monitored audience engagement and profile.

According to an embodiment herein, the monitoring device in the audience measurement and profiling system comprises an image sensor, a recording module/device, a visitor detection module, an eyeball tracking module, a data derivation module and a communication module. The image sensor is configured to capture the TV audio/visual outputs that are currently viewed by the audience and the images of the room environment. The recording module is configured to record the TV audio output and/or audio finger print, the room audio output and/or audio finger print, and TV visual outputs or video finger prints through the image sensor. The visitor detection module is configured to continuously monitor the room environment for detecting whether a visitor joined the audience to watch the TV show. The eyeball tracking module is configured to detect the audience engagement level by checking whether the audience is looking at the TV screen while watching the TV show. The data derivation module is configured to capture the demographic data including age, gender, and emotion/expression of the audience from the data captured by the image sensor. The communication module is configured to transmit the recorded TV audio output and/or audio finger print, the room audio output and/or audio finger print, TV visual outputs and/or finger print, information regarding visitor, and audience engagement level to a central server.

According to an embodiment herein, the central server in the audience measurement and profiling system comprises a comparison module, an image recognition module, an analytics module, and an audience profiling module. The comparison module is configured to compare the data received from the monitoring device with the information stored in the database. The image recognition module is configured to analyze data monitored regarding the audience to determine the profile information such as, gender, age, and trend. The analytics module is configured to determine the audience engagement level by analyzing the captured mood or expression of the audience by an eyeball tracking module in the monitoring device. The audience profiling module is configured to create profile of the audience including visitor using the information analyzed by the analytics module and the image recognition module.

According to an embodiment herein, the network is selected from a group consisting of a wireless network, wired network and public network.

According to an embodiment herein, the network is selected from a group consisting of an Internet, private network, General Packet Radio Network (GPRS), Local Area Network (LAN), Wide Area Network (WAN), Metropolitan Area Network (MAN), cellular network, Public Switched Telephone Network (PSTN), personal area network, and the like.

According to an embodiment herein, the audience measurement and profiling system is capable of detecting whether the audience skips the advertisements or watches the advertisements even during the watching of TV show in time shifted or recorded mode.

According to an embodiment herein, the demographic data of the members is initially stored in the database during the empanelment of the monitoring device.

According to an embodiment herein, the demographic data comprises name, age, gender, education details, etc.

According to an embodiment herein, the database stores the date and time stamp of the telecasted data for a preset time period from a local server. The stored data comprises the data telecasted on all TV channels in real time.

According to an embodiment herein, the central server identifies a visitor by comparing the data from the room environment with the demographic data of the members stored in the database.

According to an embodiment herein, the monitoring device is further configured to locally store the captured data even in the absence of internet connectivity and further configured to buffer and transmit the data to the central server automatically when the internet connectivity is available.

According to an embodiment herein, the monitoring device is further configured to measure an active participation of an audience while watching the TV shows/programs and advertisements on a portable computing device.

Once the TV audio output and/or audio finger print, the room audio output and/or audio finger print and the TV visual outputs output and/or video finger print the show are recorded, the monitoring device sends the recorded information to the central server through the network. The monitoring device is also configured to send the monitored viewer/visitor information to the central server. The information sent is secured to allow only partial reproduction of the image data which minimizes further identification of viewer/visitor person identity. Further, the method includes recognizing the media content or channel information by comparing the recorded TV audio output and TV visual outputs with a content database storing information containing all TV channels telecast data and outputs. The method also detects and records TV channel information in time shifted mode and time shifted advertisements. Furthermore, the method includes analyzing the monitored viewer/visitor information and profiling the visitor/viewer accordingly.

According to an embodiment herein, a data derivation module in the monitoring device infers the demographic data of age, gender and emotions/expressions locally and transmits the video signatures/fingerprints of the data to the central server. The monitoring device does not transmit actual captured images to the central server thereby protecting a privacy of the viewers watching the Television.

According to an embodiment herein, the demographic data of age, gender and emotions/expressions is derived in the central server end/side by positioning the data derivation module in the central server. The image sensor in the monitoring device collects the required data and transmits the video signatures to the data derivation module. The monitoring device does not transmit the collected images directly to the central server and thereby protecting the privacy of the viewers watching the Television.

According to an embodiment herein, the audience measurement system stores the collected data locally in the monitoring device when the internet connectivity is not available. The monitoring device is further configured to buffer and transmit the data to the server automatically when the internet connectivity is available/resumed.

According to an embodiment herein, the audience measurement system comprises a local server which is continuously fed with the data telecasted on all TV channels in real time. The local server stores the telecasted data in a database with date and time stamps for a preset time period (for example, 7 days). The central server of the audience measurement system receives the recorded audio and visual outputs or fingerprints of the TV show from the monitoring device. Further, the central server compares the received data with the telecasted real time data. When the received data does not match with the telecasted real time data, the central server compares the received data with the stored local server data to detect a time shifted mode viewing of the viewer.

According to an embodiment herein, the installation person of the monitoring device initially collects the demographic data such as name, age, gender, education details, and etc., of all the members in the home during an empanelment or installation of the monitoring device. Further, the collected data is stored in a database and is used for detecting the visitors who have joined to watch the Television show along with the regular or already registered viewers. The central server continuously receives the demographic data of the current viewers from the monitoring device. The central server compares the received demographic data with the stored demographic data of the viewer's home. When the received data of the monitoring device does not match with the stored device, the central server determines that the visitor(s) have joined to watch the television show along with the regular or registered viewers of the home.

According to an embodiment herein, the monitoring device also measures the active participation of a viewer when the viewer watches the TV shows and advertisements on portable computing devices such as laptops, tablets and etc.

According to an embodiment herein, the monitoring device provides a Graphical User Interface (GUI) to enable the house hold member or viewer to input a data regarding the possession of house hold appliances such as washing machine, air conditioner, fridge and two wheeler vehicles or four wheeler vehicles such as car. Alternatively, the installation person collects the data physically during an empanelment or installation of the monitoring device. The collected data is sent to the central database along with an identification number of the monitoring device and time and date stamps.

Figure 1:
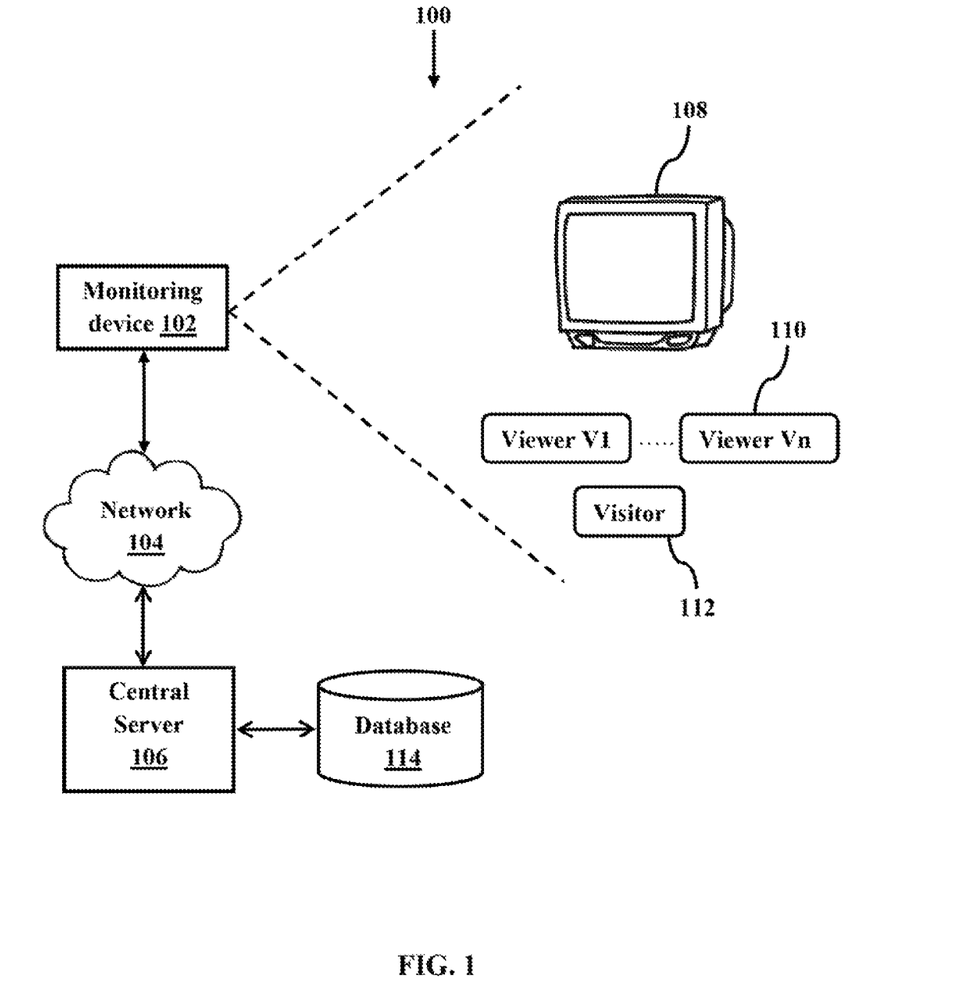
FIG. 1 illustrates a functional block diagram of an audience measurement and profiling system for TV channels and advertisements, according to one embodiment herein.

FIG. 1 illustrates a block diagram of an audience measurement and profiling system 100 for TV channels and advertisements, according to one embodiment herein. The audience measurement and profiling system 100 comprises a monitoring device 102, network 104, a central server 106, a television 108, plurality of viewers (V1 . . . Vn) 110 and a visitor 112, and a database 114.

The monitoring device 102 is configured to record TV audio output and/or audio finger print, room audio output and/or audio finger print, and TV visual outputs or video finger prints by using an image sensor and a microphone/audio recorder device, while the viewer 110 watches a TV show and advertisements. The monitoring device 102 is further configured to detect an audience engagement level by monitoring the audience expressions and behavior. The monitoring device 102 is also configured to check the active viewing of the TV programs and advertisements using eyeball tracking technique. Furthermore, the monitoring device 102 is configured to continuously check and detect whether new visitor 112 has joined to watch the TV shows along with the already registered viewers 110.

The network 104 represents the communication pathways among the monitoring device 102 and the central server 106. The monitoring device 102 communicates with the central server 106 through the network 104. The network 104 is a wired and/or wireless network such as an Internet network or dedicated network that allows the monitoring device 102 to communicate with the central server 106. The network 104 is selected from a group consisting of a wireless network, wired network, public network such as the Internet, private network, General Packet Radio Network (GPRS), Local Area Network (LAN), Wide Area Network (WAN), Metropolitan Area Network (MAN), cellular network, Public Switched Telephone Network (PSTN), personal area network, and etc.

The central server 106 is configured to receive the recorded information from the monitoring device 102 through the network 104. Further, the central server 106 is configured to recognize the media content or channel information by comparing the recorded TV audio and TV visual outputs with a content database. The central server 106 is also configured to detect and record TV channel information in time shifted mode. Furthermore, the central server 106 is configured to analyze the monitored viewer/visitor information and profile the viewer/visitor accordingly.

The system also detects whether the audience skips the advertisements or watches the advertisements even during the watching of a program in time shifted or recorded mode. The database 114 is configured to temporarily store the data telecasted on a plurality of TV channels in a real time with a time stamp for a preset time period (for example, 7 days). The database 114 also stores the demographic data such as name, age, gender, education details, and so on of all the members in the home.

Figure 2:
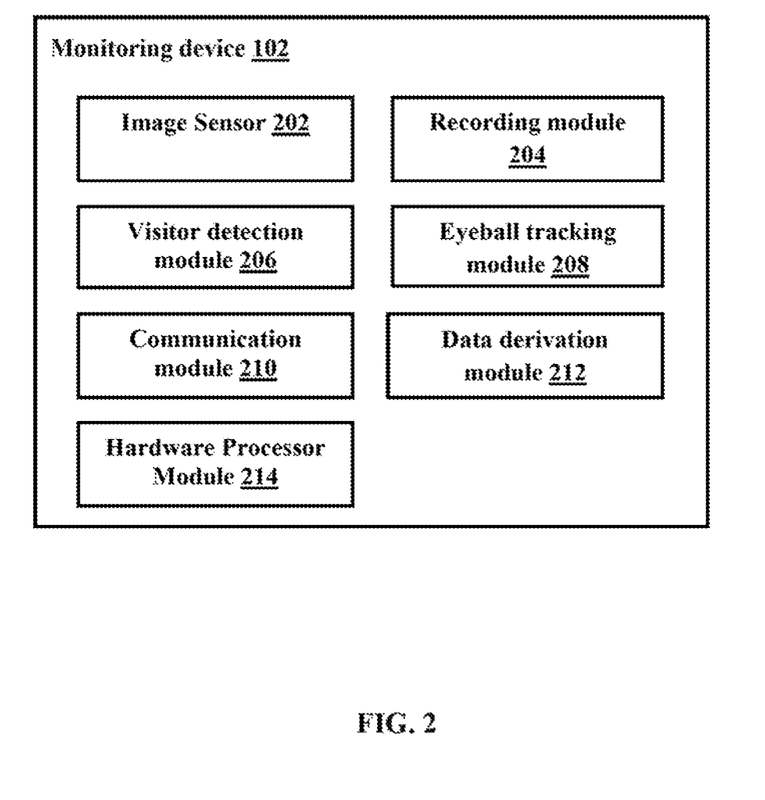
FIG. 2 illustrates a block diagram of a monitoring device, according to one embodiment herein.

FIG. 2 illustrates a block diagram of a monitoring device 102, according to one embodiment herein. The monitoring device 102 comprises an image sensor 202, a recording module 204, a visitor detection module 206, an eyeball tracking module 208, a communication module 210, a data derivation module 212 and a hardware processor 214. The image sensor 202 is configured to capture the TV audio/visual outputs that are currently viewing by the viewer 110. The image sensor 202 is also configured to monitor the viewer 110 and the visitor 112 along with the room environment. The recording module 204 is configured to record the TV audio/visual outputs or fingerprints using the image sensor 202. The data derivation module 212 is configured to capture the demographic data of age, gender, and emotion/expression of the viewer 110 from the image sensor 202. The visitor detection module 206 is configured to continuously monitor the TV room environment and detects whether the visitor 112 joined to watch the TV show along with the viewer 110.

The eyeball tracking module 208 is configured to detect the viewer/visitor engagement level by checking whether the viewer 110 or visitor 112 is looking at the TV screen while watching the TV show, using eyeball tracking technique. The communication module 210 is configured to send the recorded TV audio and visual outputs and monitored viewer/visitor information to the central server 106.

Figure 3:
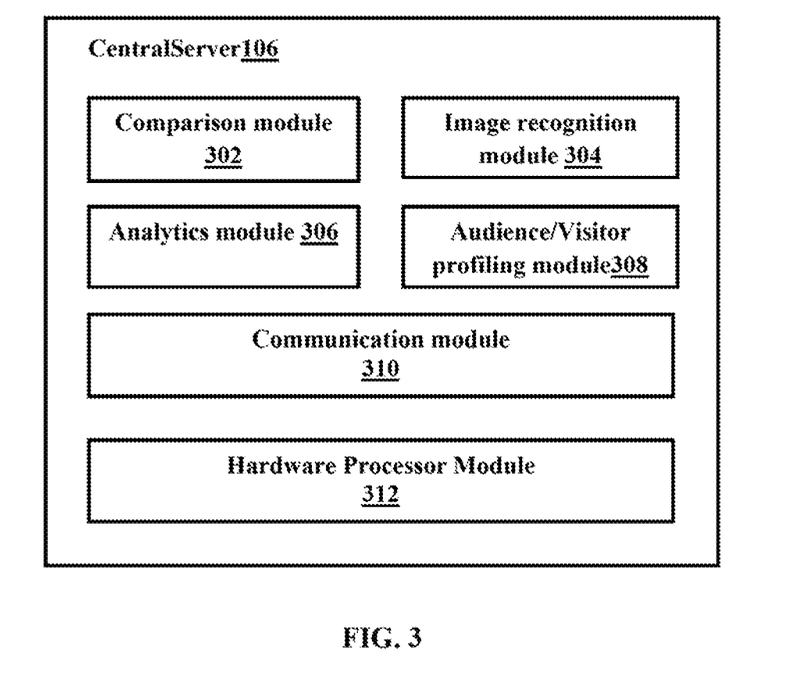
FIG. 3 illustrates a block diagram of a central server, according to one embodiment herein.

FIG. 3 illustrates a block diagram of a central server 106, according to one embodiment herein. The central server 106 comprises a comparison module 302, an image recognition module 304, an analytics module 306, an audience/visitor profiling module 308, a communication module 310 and a hardware processor 312.

The comparison module 302 is run on the hardware processor 312 and configured to compare the information received from the monitoring device 102 with the database 114. The image recognition module 304 is configured to analyze the monitored viewer/visitor information in order to determine the profile information such as, gender, age, trend etc. The analytics module 306 is configured to determine the audience engagement level by analyzing the captured mood or expression of the audience. The audience or visitor profiling module 308 is configured to create a profile of the viewer/visitor by using the information analyzed by the analytics module 306 and the image recognition module 304. The audience measurement system detects the media content or channel information without using a logo or an image or an audio watermark.

Figure 4:
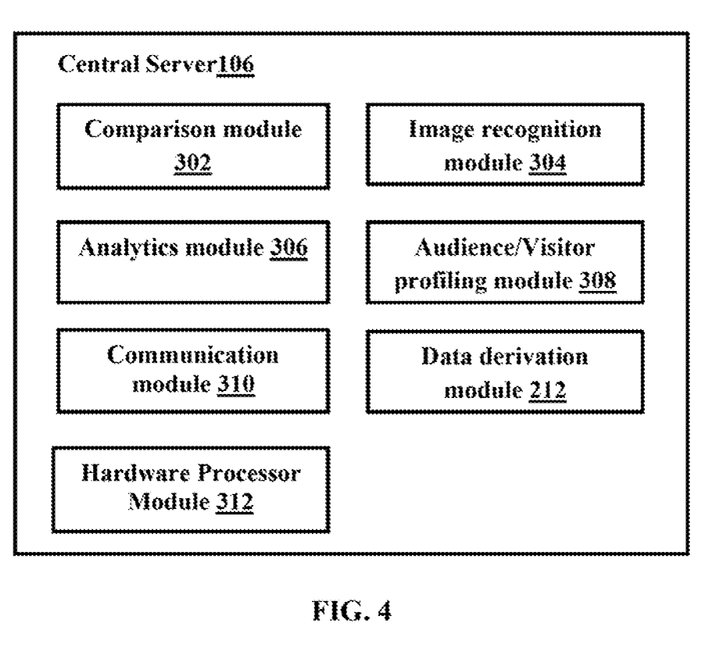
FIG. 4 illustrates a block diagram of a central server with data derivation module, according to one embodiment herein.

FIG. 4 illustrates a block diagram of a central server with data derivation module, according to one embodiment herein. The data derivation module 212 is run on the hardware processor 312 and configured to receive the video signatures from the monitoring derive 102 and derives the demographic data of age, gender and emotions/expressions of the viewer/visitor in the central server 106.

Figure 5:
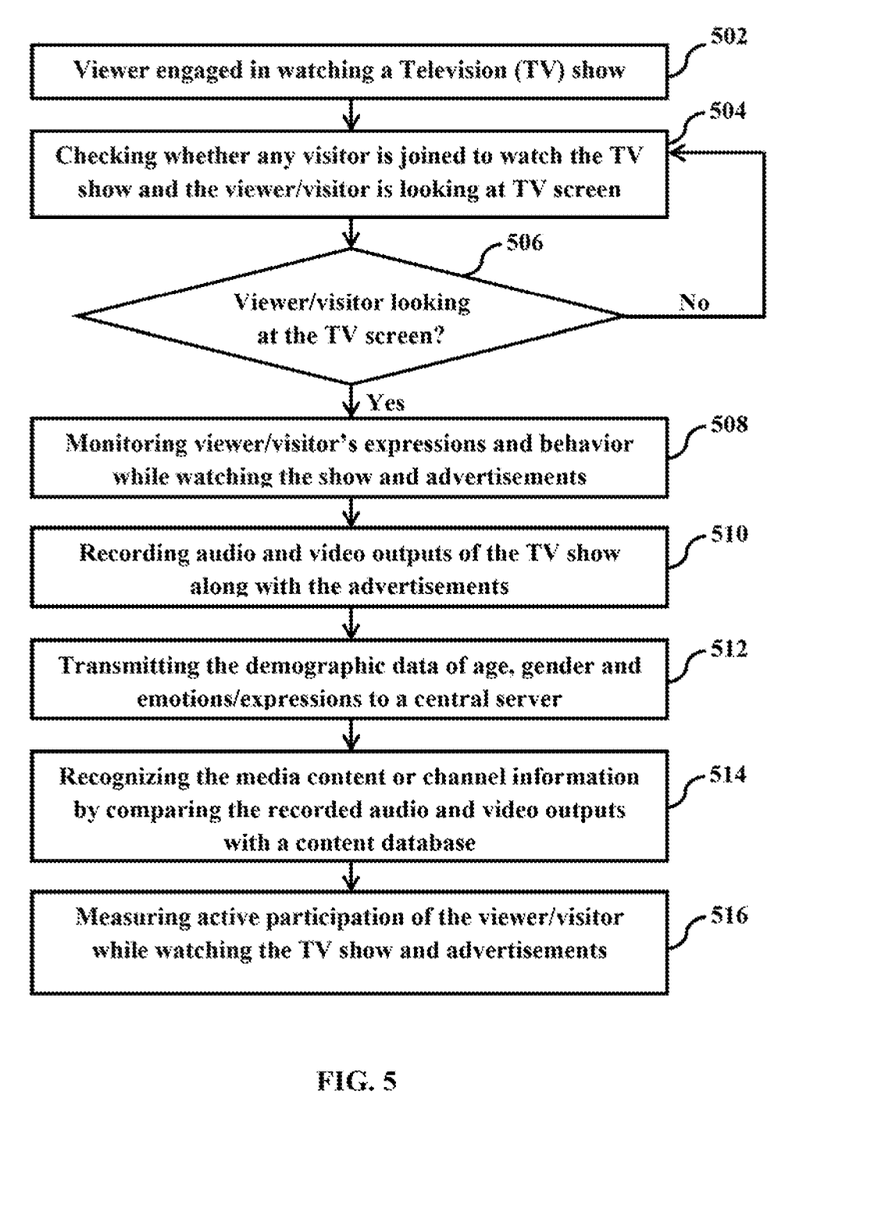
FIG. 5 illustrates a flow chart explaining a method for measuring an active participation of an audience watching the TV shows and advertisements, according to one embodiment herein.

FIG. 5 illustrates a flow chart explaining a method for profiling and measuring active participation of audience watching TV shows and advertisements, according to one embodiment herein. The method initially includes a viewer engaged in watching a Television (TV) show (502). The image sensor associated with the monitoring device checks whether any visitor is joined newly along with the already registered viewers to watch the TV program.

According to an embodiment herein, the installation person of the monitoring device initially collects demographic data such as name, age, gender, education details, and so on of all the members in the home during an empanelment or installation of the monitoring device. Further, the collected data is stored in a database and is used for detecting the visitors who have joined to watch the Television show along with the regular or already registered viewers. The central server continuously receives the demographic data of the current viewers from the monitoring device. The central server compares the received demographic data with the stored data of the viewer's home. When the received data of the monitoring device does not match with the stored device, the central server determines that the visitor(s) have joined to watch the television show along with the regular or registered viewers of the home.

Further, the method includes checking the active engagement or viewing of a TV program and advertisement by tracking eye ball movement of the audience (504). When the viewer/visitor watches the TV programs (506), the method includes monitoring viewer/visitor's expressions and behavior using the image sensor (508). Further, the method includes recording TV audio and video outputs and/or audio and video fingerprints of the show along with the advertisements (510). Once the TV audio output and/or audio finger print, room audio output and/or audio finger print and TV visual outputs and/or fingerprints of the TV show are recorded, the method includes transmitting the video signatures to the central server for deriving the demographic data of age, gender and emotion/expression.

According to an embodiment herein, the demographic data of age, gender and emotions/expressions is derived locally in the monitoring device and transmits video signatures of the data to the central server (512). The monitoring device does not transmit the actual captured images to the central server and thus protects the privacy of the viewers watching the Television.

Later, the central server recognizes the media content or channel information by comparing the recorded TV audio and video outputs and/or audio and video fingerprints with a content database containing all TV channels information. Furthermore, the analytics module in the central server measures the active participation of the viewer/visitor by using the monitored viewer/visitor information (516).

According to an embodiment herein, the audience measurement system stores the collected data locally in the monitoring device even when the internet connectivity is not available. The monitoring device further buffers and transmits the data to the server automatically when the internet connectivity is available.

According to an embodiment herein, the audience measurement system comprises a local server which is continuously fed with the data telecasted on all TV channels in real time. The local server stores the telecasted data in a database with date and time stamps for a preset time period (for example, 7 days). The central server of the audience measurement system receives the recorded audio and visual outputs of the TV show from the monitoring device. Further, the central server compares the received data with the telecasted real time data. When the received data does not match with telecasted real time data, the central server compares the received data with the stored local server data to detect a time shifted mode viewing of the viewer.

According to an embodiment herein, the monitoring device also measures the active participation of a viewer when the viewer watches the TV shows and advertisements on portable computing devices such as laptops, tablets and so on.

According to an embodiment herein, the monitoring device provides a Graphical User Interface (GUI) to enable the house hold member or viewer to input a data regarding the possession of house hold appliances such as washing machine, air conditioner, fridge and two wheeler vehicles or four wheeler vehicles such as car. Alternatively, the installation person collects the data physically during an empanelment or installation of the monitoring device. The collected data is sent to the central database along with an identification number of the monitoring device and time and date stamps.

Figure 6:
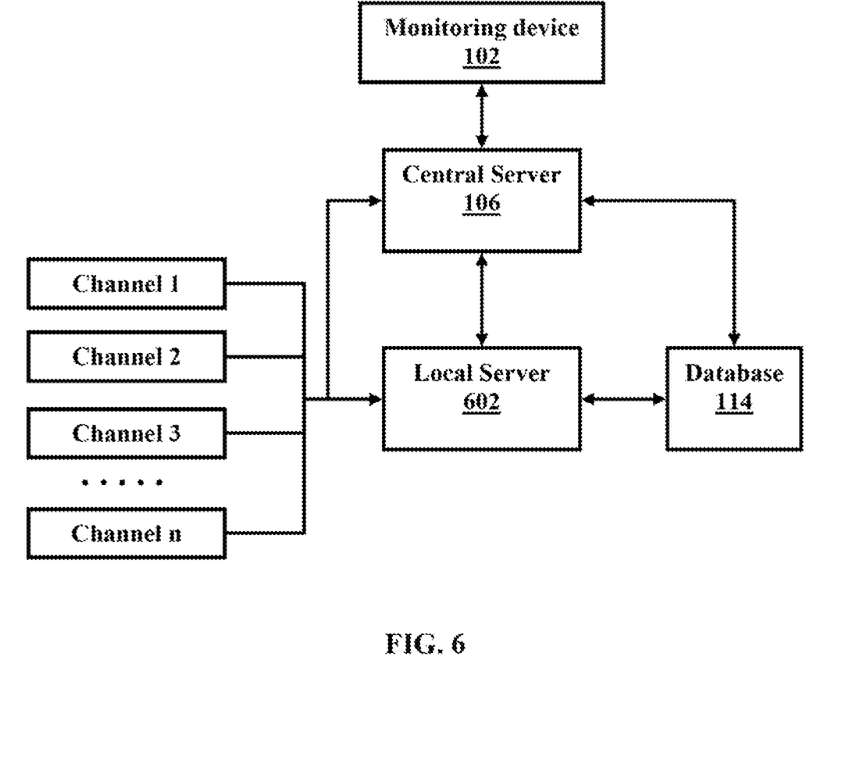
FIG. 6 illustrates a block diagram of the audience measurement and profiling system for detecting a time shifted mode viewing of a viewer, according to one embodiment herein.

FIG. 6 illustrates a block diagram of the audience measurement and profiling system for detecting a time shifted mode viewing of a viewer, according to one embodiment herein. The system comprises a local server 602, a monitoring device 102, a central server 106, and a database 114. The local server 602 is fed with the data telecasted on all TV channels in real time. The local server 602 stores the telecasted data in the database 114 with date and time stamps for a preset time period. The central server is also fed with the data telecasted on the plurality of TV channels in real time along with the recorded audio and visual outputs from the monitoring device 102. The central server 106 compares the received data with the telecasted data in real time. When the received data does not match with the telecasted data, the central server 106 compares the received data with the stored data. If the received data matches with the stored data, the central server 106 determines that the viewer is watching the TV program in the time shifted mode.

Figure 7:
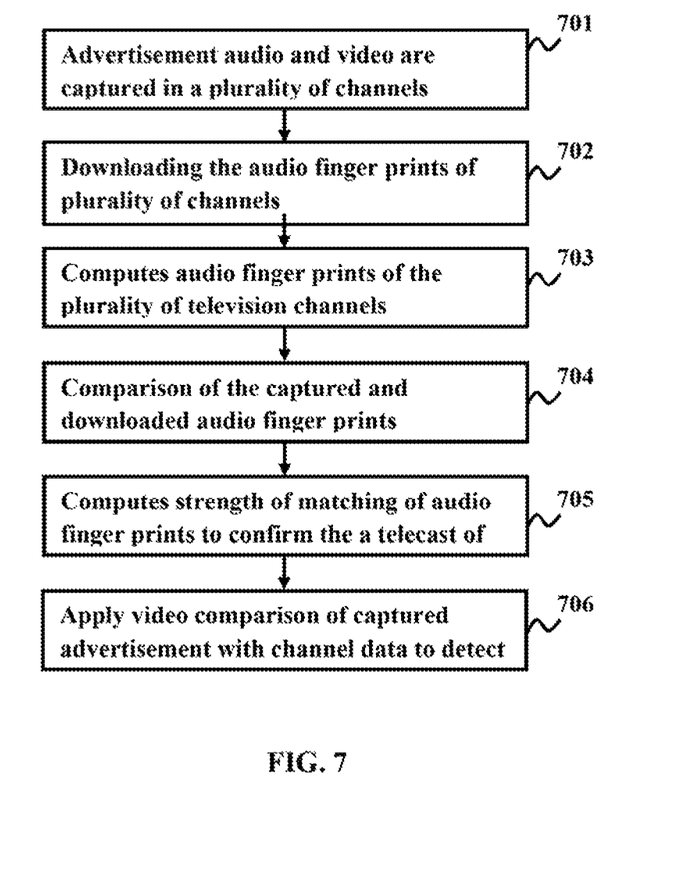
FIG. 7 illustrates a flow chart explaining a method for detecting an advertisement telecast on a television channel, advertisement telecast time and duration, according to one embodiment herein.

FIG. 7 illustrates a flow chart explaining a method for detecting an advertisement telecast on a television channel, advertisement telecast time and duration, according to one embodiment herein.

According to an embodiment herein, the system is configured to detect an advertisement, an advertisement telecast time and duration of telecast of an advertisement in a television channel accurately. The system comprises an advertisement capture module and an advertisement detection module provided in the monitoring device. The advertisement capture module is run on a hardware processor and configured to capture an advertisement telecast on a television channel watched by the audience (701). The original advertisement telecast on a plurality of channels are downloaded and saved on a database (702). Then audio finger prints of the advertisement are extracted and saved along with the original video outputs of the advertisement (703). The advertisement detection module is run of the hardware processor and configured to compute the audio fingerprints of the incoming TV channel. The computed audio fingerprints are compared with the stored audio finger prints of the advertisements (704). The strength of match of the audio finger prints of the advertisement is computed (705). The computed strength of match of the audio finger prints is compared with a preset threshold strength value. When the computed strength of match of the audio finger prints is more than the preset threshold strength value, the captured audio finger prints is judged or detected to be the audio finger print of an advertisement. When the computed strength of match of the audio finger prints is equal to the preset threshold strength value, the captured audio finger prints is judged or detected to be the audio finger print of an advertisement.

When the computed strength of match of the audio finger prints is far less the preset threshold strength value, the captured audio finger prints is judged or detected not to be the audio finger print of an advertisement, and the captured audio fingerprint is deleted or omitted.

When the computed strength of match of the audio finger prints is less the preset threshold strength value, a video comparison of the advertisement is carried out to confirm the advertisement start and completion time to compute the advertisement telecast time and the duration of the advertisement telecasted (706).

The video output and the video fingerprint of the captured advertisement is compared with the stored video output and the video fingerprint of the advertisement telecasted in frame by frame manner to detect the advertisement start frame, intermediate frames and the advertisement completion frame to calculate the advertisement start time and advertisement completion time accurately. Based on the first frame and the last frame, the advertisement telecast time and the advertisement telecast duration are also computed and provided to the advertisement sponsor with a proof of video. The duration and the telecast time of the advertisement are computed with an accuracy of 40 milliseconds.

According to an embodiment herein, the video detection algorithm is provided to accurately measure the advertisement start time, advertisement end time, and advertisement telecast duration in a television channel with a time and date stamp.

The embodiments herein provides a simple and effective audience measuring system for creating an audience profile without using a dedicated remote system.

The embodiments herein provides a system for an accurate audience measurement by measuring the active participation of audience watching TV programs and advertisements.

The embodiments herein provides a system for automatically detecting and profiling the visitors without any user intervention.

The embodiments herein provides a system the monitoring device also measures the active participation of a viewer when the viewer watches the TV shows and advertisements on portable computing devices such as laptops, tablets, etc. The monitoring device does not transmit the actual captured images to the central server and thus protects the privacy of the viewers watching the Television.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

Although the embodiments herein are described with various specific embodiments, it will be obvious for a person skilled in the art to practice the embodiments herein with modifications.

What is claimed is:

1. An audience measurement and profiling system for measuring active viewing of audience watching a television (TV) show and advertisements, the audience measurement and profiling system comprising:
   a database configured for storing information, and wherein the information includes a demographic data of members in a home, a date and time stamp of telecasted data for a preset time period;
   a monitoring device installed in the home and configured for detecting an audience engagement level using a data collected from a room where a television is placed, and wherein the data includes audio output and/or audio finger print of TV, audio output and/or audio finger print at the room, and visual outputs and/or video finger print of the TV, information regarding a visitor;
   a network configured to act as a dedicated pathway for transfer of data between the monitoring module and a central server; and
   a central server configured to compare the data received from the monitoring device with the information stored in the database to detect and record TV channel information in time shifted mode and to analyze the monitored audience engagement and profile
   wherein the monitoring device is further configured to locally store the collected data when an internet connectivity is not available, and wherein the monitoring device buffers and transmits the captured data to the central server when the internet connectivity is available, and wherein the audience measurement and profiling system is configured to detect whether the audience skips the advertisements or watches the advertisements even during the watching of TV show in time shifted or recorded mode.

2. The audience measurement and profiling system according to claim 1, wherein the monitoring device comprising:
- an image sensor configured to capture the audio and visual outputs of the TV that is currently viewed by the audience and an image of the room environment;
- a recording module configured to record audio of TV, room audio, and the visual outputs TV through the image sensor;
- a visitor detection module configured to continuously monitor the room for detecting whether a visitor is joined to the room to watch the TV show;
- an eyeball tracking module configured to detect the audience engagement level by checking whether the audience looks at the TV screen while watching the TV show;
- a data collection module configured to capture the demographic data including age, gender, and emotion/expression of the audience from the data captured by the image sensor; and
- a communication module configured to transmit the recorded TV audio, room audio, TV visual outputs, information regarding the visitor, and audience engagement level to the central server.

3. The audience measurement and profiling system according to claim 1, wherein the central server comprising:
- a comparison module configured to compare the data received from the monitoring device with the information stored in the database;
- an image recognition module configured to analyze data monitored regarding the audience to determine a profile information, and wherein the profile information includes gender, age, and trend;
- an analytics module configured to determine the audience engagement level by analyzing the captured mood or expression of the audience with the eyeball tracking module in the monitoring device; and
- an audience profiling module configured to create a profile of the audience including visitor using the information analyzed by the analytics module and the image recognition module.

4. The audience measurement and profiling system according to claim 1, wherein the network is a wireless network, or wired network or public network.

5. The audience measurement and profiling system according to claim 1, wherein the network is selected from a group consisting of an Internet, private network, General Packet Radio Network (GPRS) Local Area Network (LAN), Wide Area Network (WAN), Metropolitan Area Network (MAN), cellular network, Public Switched Telephone Network (PSTN), personal area network.

6. The audience measurement and profiling system according to claim 1, wherein the demographic data of the members is initially stored in the database during an empanelment of the monitoring device.

7. The audience measurement and profiling system according to claim 1, wherein the demographic data comprises name, age, gender, education details.

8. The audience measurement and profiling system according to claim 1, wherein the database stores the date and time stamp of telecasted data for a preset time period from a local server, and wherein the telecasted data comprises data telecasted on all TV channels in real time.

9. The audience measurement and profiling system according to claim 1, wherein the central server is configured to identify the visitor by comparing the data from the room with the demographic data of the members stored in the database.

10. The audience measurement and profiling system according to claim 1, wherein the monitoring device is further configured to measure an active participation of an audience while watching the TV shows and advertisements on a portable computing device.

* * * * *